March 19, 1957 C. M. ZAJDEL 2,785,902
TOOL HOLDERS FOR SCREW MACHINES
Filed Oct. 4, 1954

INVENTOR:
CASIMIR M. ZAJDEL
BY Milo B. Stevens & Co.
ATTYS.

United States Patent Office 2,785,902
Patented Mar. 19, 1957

2,785,902

TOOL HOLDERS FOR SCREW MACHINES

Casimir M. Zajdel, Chicago, Ill.

Application October 4, 1954, Serial No. 459,996

7 Claims. (Cl. 279—6)

My invention relates to the turrets or other tool supports of screw machines, lathes and the like, and more particularly to the holders for the tools. Such holders usually are in the form of a unit which is clamped in the turret of the machine and designed to position or project a drill, reamer or other tool in the path of approach to the work.

In most cases, the placing of a tool in a holder of the type under consideration requires the accurate centering of the tool, and various means have been employed to do this. However, such means as have come to my attention are either difficult to adjust or subject the tool to twisting influences. Also, a holder of the type specified receives a reaming tool at times, and it is desirable that such a tool be supported in a floating manner in order that it may adapt itself to the contour of the work to be reamed. With these considerations in mind, one object of the present tool holder is to provide means which make it possible to center the tool in the holder with a high degree of accuracy.

A further object is to provide a holder of the above character which is assembled in two major parts, with means facilitating the floating support of one part by the other.

Another object is to provide a holder in which a tool head is assembled with a body coaxially and means applied at different angles to procure the centering of the tool head in relation to such body.

An additional object is to dispose the centering instrumentalities in a manner to maintain the accurate and assembled relation between the tool head and the body referred to above.

An important object is to embody the features referred to in a sturdy and compact assembly, and employ means therein designed to operate efficiently over a long period of use.

With the above objects in view, a better understanding of the invention may be had by reference to the accompanying drawing, in which—

Figure 1:
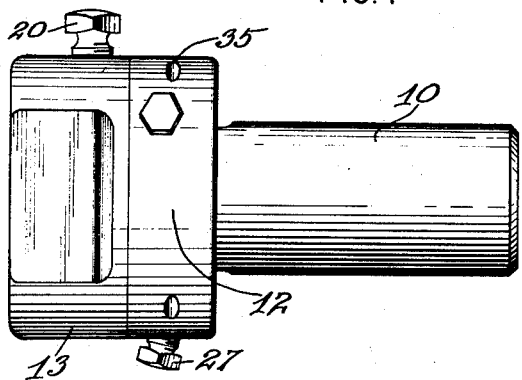
Fig. 1 is a side elevation of the novel tool holder.
Figure 2:
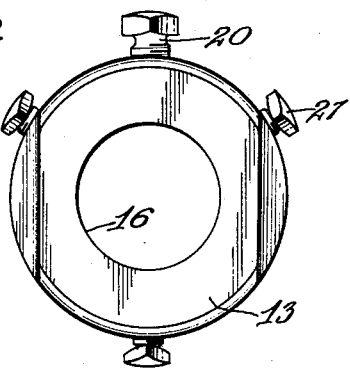
Fig. 2 is a front elevation.

In accordance with the foregoing, specific reference to the drawing indicates the shank of the tool holder at 10, the same being developed at its front end with an enlarged, cup-shaped body 12. The tool head 13 is designed to be positioned frontally of the body 12 and is dimensioned externally as a continuation thereof. The outer portions of the tool head and holder are ground accurately at the meeting plane 15 in order to aline the tool head axially with the holder.

The tool head 13 is basically in the form of a ring made with an axial bore 16 designed to receive the tool; and the shank 10 has an extension of the bore 16 in the form of a narrower one 17 to accommodate a tool of extra length or extended at the rear. The tool head 13 is tapped radially, as indicated at 19, to receive a screw 20 which is employed to clamp the tool in the holder.

Figure 4:
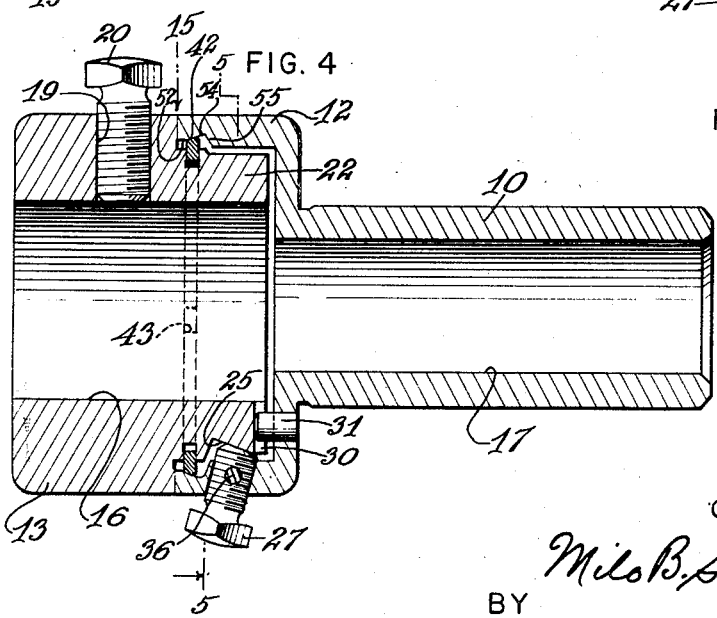
Fig. 4 is a longitudinal section of the tool holder as assembled.
Figure 6:
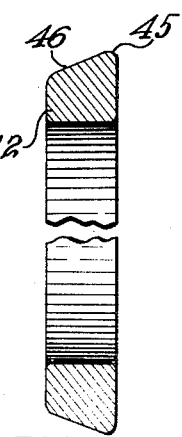
Fig. 6 is a magnified section of a ring element, partly broken away.

The tool head 13 is extended rearwardly with a neck 22 which is of an external diameter less than the internal diameter of the body 12. The neck 22 is generally of cylindrical form, but it is chamfered in its outer surface at points 120° apart to form forwardly tapered surfaces 25. The body 12 is tapped at points opposite the surfaces 25 to receive a set of three screws 27 which are directed toward the surfaces 25. The registration of these with the screws is maintained by checking the tool head from rotation, this being done by rotating a radial slot 30 in the rear surfaces of the neck 22 and projecting a pin 31 driven into the back of the body 12 into such slot, as seen in Fig. 4.

It is now apparent that the cluster of screws 27 constitutes a means for adjusting the neck 22 between them to a point where the tool head will become set in accurately centered relation to the work negotiated by the tool. When this has been done, it is possible to fix the screws 27 against accidental loosening or unthreading, such as from shock or vibration. This is done by directing a tapped bore 35 through the peripheral portion of the body 12 toward the side of each screw, inserting a free plug 36 in the forepart of the bore, and backing the plug with a screw 37. Thus, this screw may be advanced to pack the plug against the side of the screw; and the plug of course is of a softer material than the other parts in order not to mar the threads of the screw.

While the centering means just described secures a fixed assembly of the tool head and body, means are provided for disposing the tool head in floating relation to such body when the adjusting screws 27 are retracted. Thus, it is noted in Fig. 3 that the forepart of the neck 22 is made with an annular groove 40 in which is lodged a ring 42. This ring is slidingly disposed in the groove and interrupted to define spaced ends 43. Also, the outer portion of the ring is rounded at the rear as indicated at 45 and chamfered in front as shown at 46.

Figure 3:
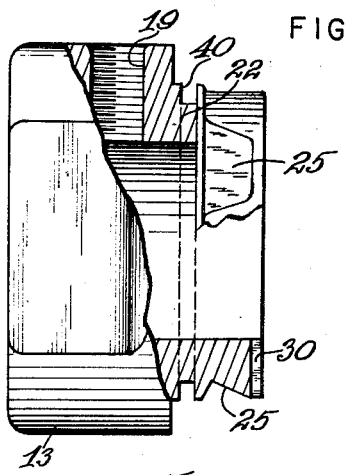
Fig. 3 is a side elevation of the tool head, partly broken away.
Figure 5:
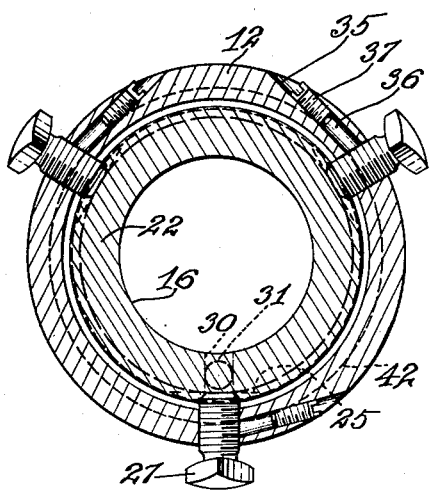
Fig. 5 is a section on the line 5—5 of Fig. 4.

It is noted in Fig. 3 that the neck 22 is built out in diameter, as shown at 50, to accommodate the ring 42 to a considerable depth in the groove 40 without unduly reducing the thickness of the neck. The internal form of the body 12 is also varied from its regular portion in the rear. Thus, the entrance into the body 12 is enlarged with a cylindrical portion 52 spaced from the portion 50 of the neck and further enlarged from the portion 52 with a rearwardly flared portion 54, a converging continuation 55 of this portion returning to the regular recess in the rear of the body. The angle of the flared portion 54 is similar to that of the ring chamfer 46; and Fig. 4 shows that the ring seats in the said flared portion when the tool head is assembled with the body.

The ring 42 is contractible in the groove 40 when the neck 22 is backed into the body 12 for assembling the tool head 13 with the same. Thus, the ring contracts momentarily during its entrance into the body 12, and then expands to seat in the flared portion 54 of the said body. This action causes the tool head to be retained to the body and seat accurately endwise of the same. With the screws 27 loosened, the yieldable connection formed by the ring 42 between the tool head and the body will dispose the tool head floatingly, so that a reaming tool held by the same may yield to follow the contour of the work. However, when the tool head is not to be disposed floatingly, the screws 27 have a function additional to that of centering the tool head. It is noted from Fig. 4 that such screws are tilted rearwardly to meet the surfaces 25. Thus, when the screws are advanced for the centering of the tool head, they also bear rearwardly on the neck 22 to draw the tool head into firm endwise engagement with the body 12, insuring the integral assembly of the tool holder.

It is now apparent that the novel tool holder has a number of advantageous features. First, it is assembled compactly in endwise relation to combine its body with the tool head in accurate relation. Further, it is devoid of any adjusting parts or projections in its interior, allowing the free insertion of a tool into the holder. Further, the neck of the tool head is positioned for adjustment from three equally distributed directions, facilitating accuracy in adjustment and rigidity to prevent twisting or loosening tendencies on the part of the tool head. Further, the holder incorporates a yielding internal connection which disposes the tool head in floating relation to the body when the centering screws are retracted, so that reaming tools may be disposed yieldingly in relation to the work. Further, the centering and floating features are largely within the holder, being protected from contact or injury by outside influences and leaving the exterior of the holder smooth over the greater part of its surface. Finally, the novel holder is composed of parts which are few and sturdy in construction, whereby to make it possible to produce the holder at low cost and render it durable over a long period of use.

While I have described the invention along specific lines, various minor changes or refinements may be made therein without departing from its principle, and I reserve the right to employ all such changes and refinements as may come within the scope and spirit of the appended claims.

I claim:

1. A tool holder for use in screw machines and the like comprising a shank, a cup enlargement at one end thereof, a head applicable to the cup and extended with a neck into the same, and means between the cup and the neck for adjusting the head into axial alinement with the shank, said neck having an annular groove, and a ring seating in said groove and against the inner surface of the cup wall, said ring being yieldable to dispose the head floatingly in said cup.

2. A tool holder for use in screw machines and the like comprising a shank, a cup enlargement at one end thereof, a head applicable to the cup and extended with a neck into the same, and means between the cup and the neck for adjusting the head into axial alinement with the shank, said neck having an annular groove, and a ring seating in said groove and against the inner surface of the cup wall, said ring being split to dispose the head floatingly in said cup.

3. A tool holder for use in screw machines and the like comprising a shank, a cup enlargement at one end thereof, a head applicable to the cup and extended with a neck into the same, and means between the cup and the neck for adjusting the head into axial alinement with the shank, said neck having an annular groove, a ring seating in said groove, the entrance into the cup having an undercut annular recess, and the periphery of said ring being formed to fit said recess and form a stop against the accidental outward movement of said head.

4. A tool holder for use in screw machines and the like comprising a shank, a cup enlargement at one end thereof, a head applicable to the cup and extended with a neck into the same, and means between the cup and the neck for adjusting the head into axial alinement with the shank, said neck having an annular groove, a ring seating in said groove, the entrance into the cup having an inwardly flared annular recess, and the periphery of said ring being chamfered to fit said recess and form a stop against the accidental outward movement of said head.

5. A tool holder for use in screw machines and the like comprising a shank, a cup enlargement at one end thereof, a head applicable to the cup and extended with a neck into the same, and means between the cup and the neck for adjusting the head into axial alinement with the shank, said means comprising surfaces on the periphery of said neck which are circularly spaced and face toward the outer end of the head, and screws threaded through the walls of the cup toward said surfaces at angles converging toward the shank.

6. A tool holder for use in screw machines and the like comprising a shank, a cup enlargement at one end thereof, a head applicable to the cup and extended with a neck into the same, and means between the cup and the neck for adjusting the head into axial alinement with the shank, said means comprising surfaces on the periphery of said neck which are circularly spaced and converge toward the outer end of the head, and screws threaded through the walls of the cup toward said surfaces at angles converging toward the shank.

7. A tool holder for use in screw machines comprising a shank, a cup enlargement at one end thereof, a head in endwise engagement with the cup and extended with a neck into the same, and means between the sides of the cup and the neck for adjusting the head into axial alinement with the shank, such means also effective to press the head against the cup for maintaining said engagement.

References Cited in the file of this patent

UNITED STATES PATENTS 2,435,396    Koch _____ Feb. 3, 1948